(12) United States Patent
Guo

(10) Patent No.: US 12,240,356 B2
(45) Date of Patent: Mar. 4, 2025

(54) TETHER ASSEMBLY AND CHILD SAFETY SEAT

(71) Applicant: WONDERLAND SWITZERLAND AG, Steinhausen (CH)

(72) Inventor: Zhengwen Guo, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 0 days.

(21) Appl. No.: 17/512,915

(22) Filed: Oct. 28, 2021

(65) Prior Publication Data

US 2022/0134915 A1 May 5, 2022

(30) Foreign Application Priority Data

Oct. 29, 2020 (CN) .......................... 202011187523.3

(51) Int. Cl.
 *B60N 2/28* (2006.01)
(52) U.S. Cl.
 CPC ......... *B60N 2/2806* (2013.01); *B60N 2/2803* (2013.01); *B60N 2/2809* (2013.01); *B60N 2/2816* (2023.08)
(58) Field of Classification Search
 CPC ............................ B60N 2/2806; B60N 2/2809
 See application file for complete search history.

(56) References Cited

U.S. PATENT DOCUMENTS

| 6,454,304 B1 | 9/2002 | Steffens, Jr. |
| 6,868,745 B2 | 3/2005 | Sullivan et al. |
| 7,224,270 B2 | 5/2007 | Patterson et al. |
| 7,322,648 B2 * | 1/2008 | Nakagawa ........... B60N 2/2839 297/254 |
| 7,422,283 B2 | 9/2008 | Patterson et al. |
| 7,552,969 B2 * | 6/2009 | Maciejczyk ......... B60N 2/2809 297/484 |
| 7,648,199 B2 * | 1/2010 | Amesar ................ B60N 2/2809 297/472 |

(Continued)

FOREIGN PATENT DOCUMENTS

| AU | 2016256730 A1 | 11/2016 |
| CN | 2331383 Y | 8/1999 |

(Continued)

OTHER PUBLICATIONS

Office Action issued in corresponding Taiwanese Patent Application No. 109140224 on Nov. 17, 2021, consisting of 9 pp.

(Continued)

*Primary Examiner* — Philip F Gabler
(74) *Attorney, Agent, or Firm* — Volpe Koenig

(57) ABSTRACT

The disclosure provides a tether assembly for fixing a child safety seat to a vehicle. The tether assembly comprises: an adjuster for adjusting a length of the tether assembly; a tether fixing portion being fixable to a corresponding fixing portion of the vehicle; a top tether comprising at least two belts, the top tether connects the child safety seat to the tether fixing portion via the adjuster, and at least one belt of the top tether passes through the adjuster to form at least two free ends. The tether assembly of the disclosure may be tightened in at least two directions, thereby making the mounting of the tether assembly more convenient.

19 Claims, 25 Drawing Sheets

(56) References Cited

U.S. PATENT DOCUMENTS

| | | | |
|---|---|---|---|
| 8,235,463 B2* | 8/2012 | Stiyer | B60N 2/2893 |
| | | | 297/254 |
| 9,061,611 B2* | 6/2015 | Love | B60N 2/2863 |
| 9,610,870 B2 | 4/2017 | Pos | |
| 9,688,195 B1 | 6/2017 | Hammond | |
| 9,994,150 B2 | 6/2018 | Appukutty et al. | |
| 10,115,282 B1 | 10/2018 | Merrill | |
| 10,752,134 B2* | 8/2020 | Hoover | B60N 2/2887 |
| 10,829,013 B2* | 11/2020 | Cohen | B60N 2/2821 |
| 2011/0193394 A1 | 8/2011 | Stiyer | |
| 2015/0336481 A1* | 11/2015 | Horsfall | B60N 2/286 |
| | | | 297/256.16 |
| 2016/0207497 A1 | 7/2016 | Seal et al. | |
| 2018/0099588 A1 | 4/2018 | Anderson et al. | |
| 2018/0208085 A1* | 7/2018 | Renaudin | B60N 2/2872 |
| 2018/0222439 A1 | 8/2018 | Eaton | |
| 2020/0163418 A1* | 5/2020 | Morgan | A44B 11/10 |

FOREIGN PATENT DOCUMENTS

| | | |
|---|---|---|
| CN | 2489816 Y | 5/2002 |
| CN | 101195353 A | 6/2008 |
| CN | 202624140 U | 12/2012 |
| CN | 103099468 A | 5/2013 |
| CN | 103538553 A | 1/2014 |
| CN | 104540709 A | 4/2015 |
| CN | 205311388 U | 6/2016 |
| CN | 205573678 U | 9/2016 |
| CN | 103538553 B | 3/2017 |
| CN | 206254960 U | 6/2017 |
| CN | 107031559 A | 8/2017 |
| CN | 107223095 A | 9/2017 |
| CN | 207141004 U | 3/2018 |
| CN | 108025660 A | 5/2018 |
| CN | 108778829 A | 11/2018 |
| CN | 208248021 U | 12/2018 |
| CN | 109177830 A | 1/2019 |
| CN | 109515264 A | 3/2019 |
| CN | 209079854 U | 7/2019 |
| CN | 110103786 A | 8/2019 |
| CN | 110370993 A | 10/2019 |
| CN | 112078449 A | 12/2020 |
| CN | 109515264 B | 6/2023 |
| EP | 2928338 A1 | 6/2014 |
| FR | 2548983 A1 | 1/1985 |
| FR | 2861658 A1 | 5/2005 |
| FR | 2861658 B1 | 12/2006 |
| FR | 2946582 A1 | 12/2010 |
| FR | 2988352 A1 | 9/2013 |
| JP | 2009517274 A | 4/2009 |
| JP | 2017149391 A | 8/2017 |
| JP | 2018514457 A | 6/2018 |
| JP | 2023501822 A | 1/2023 |
| TW | 573636 U | 1/2004 |
| TW | M504627 U | 7/2015 |
| TW | 201716265 A | 5/2017 |
| WO | 2007134097 A2 | 11/2007 |
| WO | 2007134907 A2 | 11/2007 |
| WO | 2016183156 A1 | 11/2016 |

OTHER PUBLICATIONS

International Search Report issued on Aug. 7, 2021 in International Patent Application No. PCT/CN2020/129670, consisting of 43 pp.
International Search Report issued on Jan. 29, 2021 in International Patent Application No. PCT/CN2020/129670, consisting of 6 pp.
Search Report issued on Aug. 6, 2021 in Chinese Patent Application No. 202011187515.9, consisting of 21 pp.
Search Report issued on Aug. 2, 2021 in Chinese Patent Application No. 202011187523.3, consisting of 18 pp.
Office Action issued in Counterpart German Patent Application No. 10 2021 212 199.3 dated Feb. 2, 2023.
Office Action issued in Counterpart Chinese Patent Application No. 201911138004.5 dated Jul. 14, 2022.
Office Action issued in Counterpart Chinese Patent Application No. 201911138004.5 dated Feb. 5, 2023.
Office Action issued in corresponding Australian Application No. 2020388822 dated Aug. 21, 2023.
Office Action issued in corresponding Japanese Application No. 2022-528687 dated Jul. 31, 2023. English Translation Provided.
"Office Action for U.S. Appl. No. 17/777,585", Mailed Date: Mar. 13, 2024, 16 pages.
Partial Supplementary European Search Report issued in corresponding European Application No. 20890602.4 dated Dec. 11, 2023.
Notice of Reasons for Refusal for corresponding Japanese Application No. 2024-001865 dated Nov. 14, 2024.

* cited by examiner

TETHER ASSEMBLY AND CHILD SAFETY SEAT

TECHNICAL FIELD

The disclosure relates to a tether assembly, and particularly to a tether assembly which can be adjusted in multiple ways. Furthermore, the disclosure also relates to a child safety seat.

BACKGROUND

A child safety seat is a seat specially designed for children. By assembling the child safety seat in a car for a child to sit on the child safety seat, the child is restrained by the child safety seat so to ensure the child safe.

An existing child safety seat usually comprises a base and a seat disposed on the base. An ISOFIX interface is directly disposed on a side of the base, and a top tether is directly fixed on a back of the seat. By respectively connecting the top tether and the ISOFIX interface of the child safety seat to corresponding installation places in the car, the child safety seat may be fixed. The ISOFIX interface is fixed on both sides of the base, and the top tether interface is fixed on an upper part of the child safety seat. Through three-point fixation, the child safety seat can be firmly fixed on the car seat and will not turn over when subjected to an impact.

The top tether needs to be tightened after it is fixed in place, so as to firmly connecting it to other parts of the child safety seat. However, in the traditional way, the length of the top tether can only be adjusted in one direction, moreover, in different types of cars, it may be difficult to apply sufficient tension due to limited space. Therefore, there is a need for a tether assembly which can easily tighten the top tether in a variety of ways and a child safety seat with such tether assembly.

SUMMARY

An object of the disclosure is to provide a tether assembly and a child safety seat which can reduce or eliminate at least one of the above-mentioned defects.

In order to achieve the above mentioned object, in an aspect, the disclosure provides a tether assembly for fixing a child safety seat to a vehicle, wherein the tether assembly comprises: an adjuster for adjusting a length of the tether assembly; a tether fixing portion being fixable to a corresponding fixing portion of the vehicle; a top tether including at least two belts, the top tether connects the child safety seat to the tether fixing portion via the adjuster, and at least one belt of the top tether passing through the adjuster to form at least two free ends.

In an embodiment, the child safety seat includes a base, a seat disposed above the base, and a top rod erected at a rear of the base.

In an embodiment, the adjuster is a one-way adjuster, the top tether includes three belts, one ends of a first belt and a second belt of the three belts are respectively fixed to both sides of the child safety seat, the other ends of the first belt and the second belt of the three belts are respectively connected to both ends of a third belt of the three belts via two one-way adjusters, the tether fixing portion is fixedly or slidably connected to any one of the three belts, and the top tether passes through the two one-way adjusters to form two free ends.

In an embodiment, the two one-way adjusters are oriented in a same direction, such that the two free ends extend in the same direction.

In an embodiment, the two one-way adjusters are oriented in opposite directions, such that the two free ends extend in the opposite directions.

In an embodiment, the tether fixing portion is fixedly or slidably connected to the first belt or the second belt.

In an embodiment, the tether fixing portion is fixedly or slidably connected to the third belt.

In an embodiment, the adjuster is a two-way adjuster or a one-way adjuster, and the at least two free ends are formed by the top tether passing through the two-way adjuster or the one-way adjuster.

In an embodiment, the top tether includes three belts, one ends of a first belt and a second belt of the three belts are respectively fixed to both sides of the child safety seat, the other ends of the first belt and the second belt of the three belts are connected to one end of a third belt of the three belts via a connecting member.

In an embodiment, the top tether further includes a fourth belt, the third belt is connected to the fourth belt via two one-way adjusters or one two-way adjuster, and the tether fixing portion is fixedly or slidably connected to the fourth belt.

In an embodiment, the top tether includes three belts, both ends of a first belt of the three belts are respectively fixed to both sides of the child safety seat, one end of a second belt of the three belts is fixedly or slidably connected to the first belt, one end of a third belt of the three belts is connected to the other end of the second belt via two one-way adjusters or one two-way adjuster, and the tether fixing portion is fixedly or slidably connected to the other end of the third belt.

In an embodiment, the top tether includes two belts, one ends of the two belts are respectively fixed to both sides of the child safety seat, the other ends of the two belts are respectively connected to the adjuster, the tether fixing portion is fixedly or slidably connected to one of the two belts, the adjuster is a two-way adjuster, and the two-way adjuster can adjust a length of the tether assembly in two opposite directions.

In an embodiment, the top tether includes two belts, one end of a first belt of the two belts is fixed to the child safety seat, the other end of the first belt is connected to one end of a second belt of the two belts via two one-way adjusters or one two-way adjuster, and the tether fixing portion is fixedly or slidably connected to the other end of the second belt.

In an embodiment, the two one-way adjusters are oriented in opposite directions, and the two one-way adjusters are connected to each other by a connecting belt.

In an embodiment, the adjuster has a locked position and a released position, in the locked position, the top tether passing through the adjuster is clamped by the adjuster, and in the released position, the adjuster allows the top tether passing through the adjuster to move relative to the adjuster.

According to another aspect of the disclosure, a child safety seat is provided. The child safety seat comprises: a base provided with an anchor part protruding backwardly; a seat coupled to the base; a top rod fixed to a rear of the base; and the tether assembly mentioned above, the top tether of the tether assembly is fixed to the top rod.

In an embodiment, the top rod includes two vertical rods and a fixing portion, and each of tops of the two vertical rods is provided with an opening.

In an embodiment, the top rod includes two vertical rods and a fixing portion, and an upper surface of the fixing portion is centrally provided with an opening.

In an embodiment, the top rod includes one vertical rod and one accommodating portion, and an upper surface of the accommodating portion is centrally provided with an opening.

According to another aspect of the disclosure, a tether assembly for fixing a child safety seat to a vehicle is provided, wherein the tether assembly comprises: a two-way adjuster being able to adjust a length of the tether assembly in two opposite directions; a tether fixing portion being fixable to a corresponding fixing portion of the vehicle; a top tether including more than a plurality of belts separated from each other, wherein the top tether connects the two-way adjuster to the child safety seat, and connects the two-way adjuster to the tether fixing portion.

In an embodiment, the two-way adjuster includes: an adjuster housing having two first openings facing opposite directions; two button respectively disposed at the two first openings and movable in directions of entering and leaving the adjuster housing; a fixed sheet fixed on a bottom of the adjuster housing and formed with two second openings; two locking members disposed inside the adjuster housing and being movable along with the two buttons to form a locked position and a released position.

In an embodiment, the plurality of belts include two belts, the two belts being able to enter the adjuster housing via the two second openings, pass through a gap between the two locking members and the fixed sheet, and extend out of the adjuster housing to form free ends extending in two opposite directions, and wherein in the locked position, the two locking members and the fixed sheet respectively clamp the two belts, and in the released position, the two locking members and the fixed sheet allow the two belts to move.

In an embodiment, in the released position, when the free ends are pulled, the tether assembly is shortened, and when portions of the two belts other than the free ends are pulled, the tether assembly extends longer.

In an embodiment, a spring is disposed between the two buttons for respectively applying force to the two buttons for moving out of the adjuster housing.

In an embodiment, two tightening indicating windows are formed on an upper surface of the adjuster housing to respectively indicate whether the two belts are tightened.

The disclosure has at least one of the following beneficial effects:

The tether assembly of the disclosure can be tightened in at least two directions, such that the mounting of the tether assembly is more convenient. Meanwhile, because the tightening force may be applied more easily, may also be assuredly tightened, and the safety of the tether assembly may be improved. The tether assembly of the disclosure can be adjusted in length by a more extent. The tether assembly of the disclosure can be tightened on different sides of the child safety seat, such that no matter the child safety seat is placed on which side of the vehicle seat, tightening operation can be conveniently performed.

BRIEF DESCRIPTION OF THE DRAWINGS

By considering the following detailed description of the preferred embodiments of the disclosure in conjunction with the accompanying drawings, various objectives, features and advantages of the disclosure will become more apparent. The drawings are merely exemplary illustrations of the disclosure and are not necessarily drawn to scale. In the drawings, the same reference numerals always refer to the same or similar parts, in which.

DETAILED DESCRIPTION

In order to further explain the principle and structure of the disclosure, the preferred embodiments of the disclosure will be described in detail with reference to the accompanying drawings. However, these embodiments are only for illustrative and explanatory purposes, and cannot be used to limit the patent protection scope of the disclosure.

The terms used in the disclosure are only for the purpose of describing specific embodiments, and are not intended to limit the disclosure. The singular forms of "a", "said" and "the" used in the disclosure and the appended claims are also intended to include plural forms, unless the context clearly indicates other meanings. It should also be understood, the terms "and/or" as used herein refers to and includes any or all possible combinations of one or more associated listed items.

The following is a more detailed description of the various concepts and implementations of the tether assembly and the child safety seat. The seat of the child safety seat may be rotated between a rearward position, a lateral position and a forward position for facilitating use. It should be understood, the various concepts introduced above and discussed in more detail below can be implemented in a variety of ways. Furthermore, examples of specific implementations and applications are mainly for illustrative purposes, so that those skilled in the art can implement implementations and alternatives that are obvious to those skilled in the art.

Figure 1:
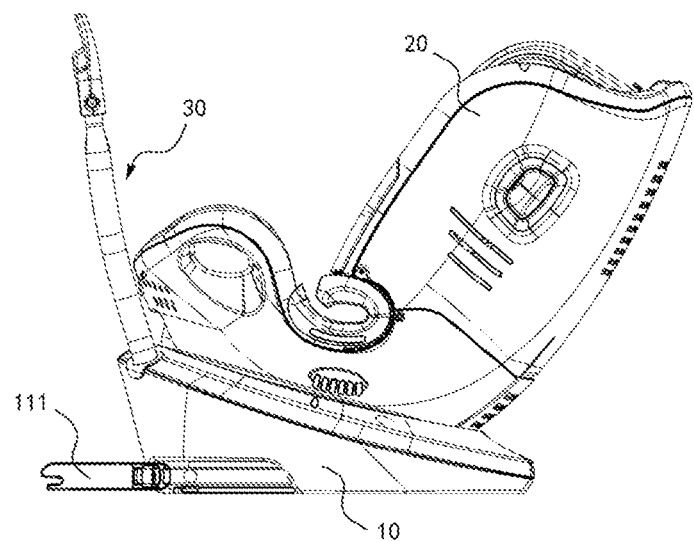
FIG. 1 is a side view of a child safety seat of an embodiment of the disclosure.
Figure 2:
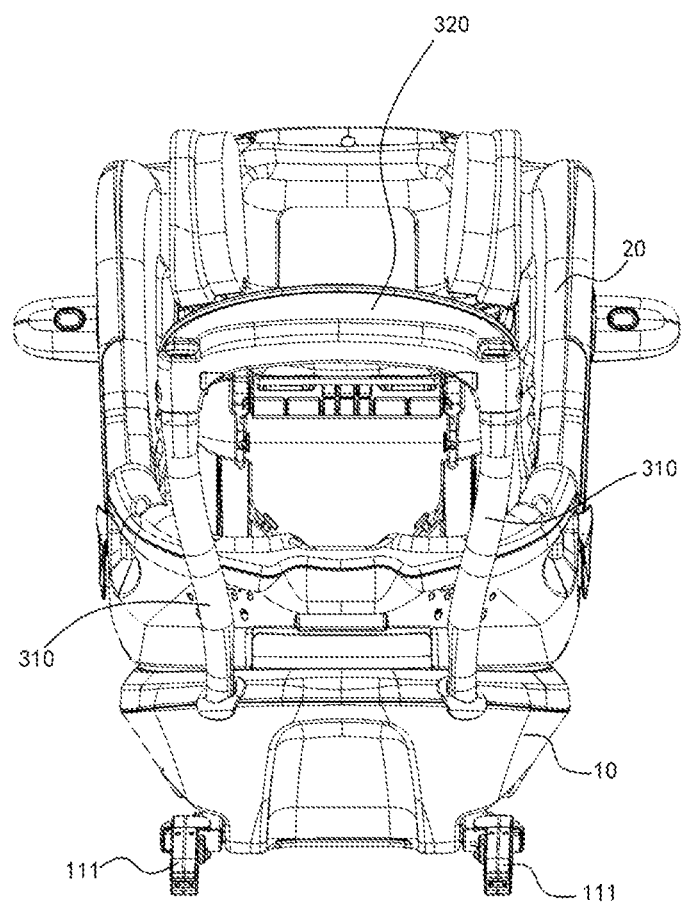
FIG. 2 is a front view of the child safety seat of the embodiment of the disclosure.
Figure 3:
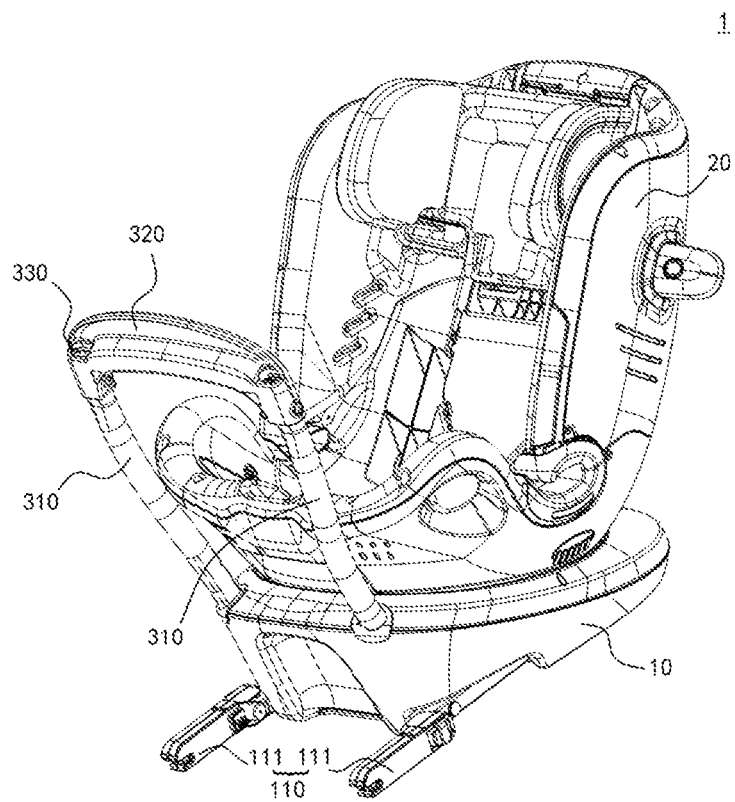
FIG. 3 is a perspective view of the child safety seat of the embodiment of the disclosure.

FIG. 1 is a side view of an embodiment of a child safety seat of the disclosure, and FIG. 2 is a front view of the embodiment of the child safety seat of the disclosure.

The child safety seat 1 may comprise a base 10, a seat 20 disposed above the base 10, and a top rod 30 erected at the rear of the base 10.

The base 10 may be provided with an anchor part 110 protruding backwardly. The anchor part 110 may be an ISOFIX connector (a connector which can be fixed to an ISOFIX interface), and includes two anchoring arms 111.

The child safety seat 1 may comprises a tether assembly 40. Optionally, the tether assembly 40 may also be a separate assembly other than the child safety seat 1. The tether assembly 40 may be a Top Tether connector (a connector which can be fixed to a Top Tether interface).

The top rod 30 may be fixed to the rear of the base 10. Specifically, the top rod 30 may be substantially vertically erected at the rear of the base 10. An upper portion of the top rod 30 may be provided with an opening 330. In different embodiments, the top rod 30 may be provided with one or two openings 330. A top tether 410 (will be described in detail below) of the tether assembly 40 is fixed to the child safety seat 1 through the opening 330. For example, the top tether 410 extends into the top rod 30 through the opening 330 and is fixed therein.

In an embodiment, the top rod 30 may include two vertical rods 310 and one fixing portion 320, and tops of the two vertical rods 310 are each provided with an opening 330.

One ends of two belts (e.g., a connecting belt 412 and an adjusting belt 411) of the top tether 410 may respectively be fixed to the top rod 30 via the two vertical rods 310. One connecting belt 412 and two adjusting belts 411 of the top tether 410 are connected to each other via two adjusters 430, and a tether fixing portion 450 is fixedly or movably connected to one of the adjusting belts 411, such that the tether assembly 40 formed as a whole into a Y shape or a V shape. Moreover, one ends of the belts may move a certain distance within the top rod 30.

One ends of two belts (e.g., two connecting belts 412) of the top tether 410 may be respectively fixed to the top rod 30 through the two vertical rods 310. Moreover, two adjusters 430 are fixed to the other ends of the two belts. Both ends of one adjusting belt 411 respectively pass through the two adjusters 430 to form two free ends 4111, and the tether fixing portion 450 is fixedly or movably connected to the adjusting belts 411, such that the tether assembly 40 is formed as a whole into a Y shape or a V shape.

One ends of two belts (e.g., two connecting belts 412) in the top tether 410 may be respectively fixed to the top rod 30 through two vertical rods 310. A connecting member 460 is fixed to the other ends of the two belts. One end of one of the adjusting belts 411 is fixed to the connecting member 460. The other end of this adjusting belt 411 may pass through one adjuster 430, and another adjusting belt 411 may pass through another adjuster 430 to form two free ends 4111, such that the tether assembly 40 is formed as a whole into a Y shape or a V shape. The above two adjusters 430 may be connected to each other (e.g., via the connecting belts 412).

In an embodiment, both ends of one belt in the top tether 410 (e.g., the connecting belt 412) are fixed to the top rod 30 respectively through the two vertical rods 310. The adjusting belts 411 are fixedly or slidably connected to the belt (optionally, connected to other adjusting belt 411, the connecting belt 412 and the adjuster 430), such that the tether assembly 40 is formed as a whole into a T shape.

Figure 6:
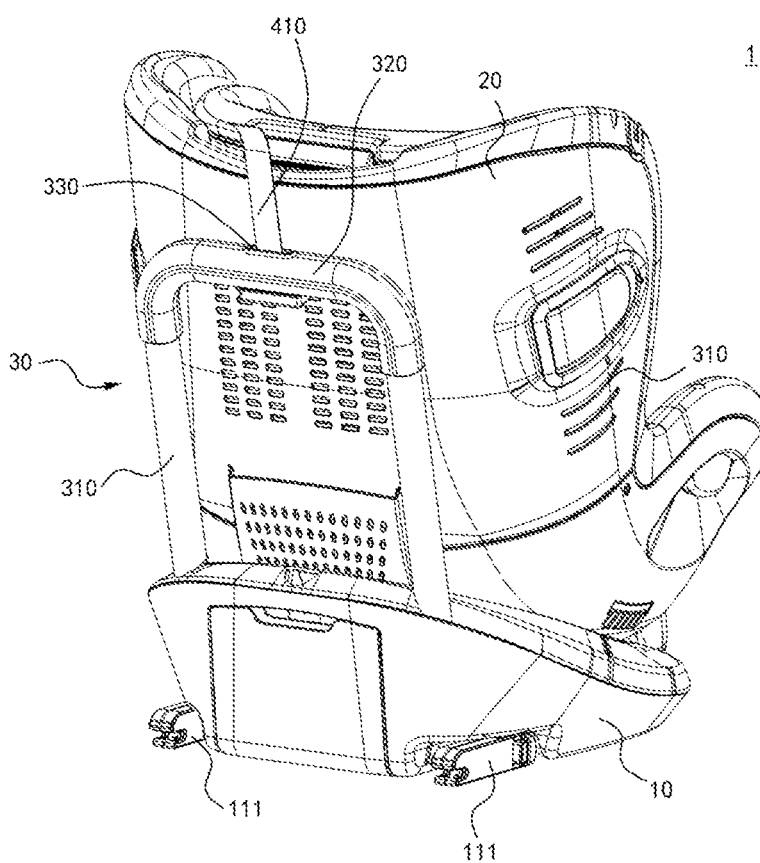
FIG. 6 is a perspective view of another embodiment of the child safety seat of the disclosure.

In an embodiment, as shown in FIG. 6, the top rod 30 may include two vertical rods 310 and one fixing portion 320.

Specifically, the top rod 30 includes: two vertical rods 310, symmetrically erected at the rear of the base 10; a fixing portion 320, coupled to top ends of the two vertical rods 310, and an accommodating portion 340, disposed centrally on a lower surface of the fixing portion 320.

One end of one belt (e.g., a connecting belt 412) in the top tether 410 may be fixed to the top rod 30. The end of the belt may move a limited distance within the top rod 30.

Figure 7:
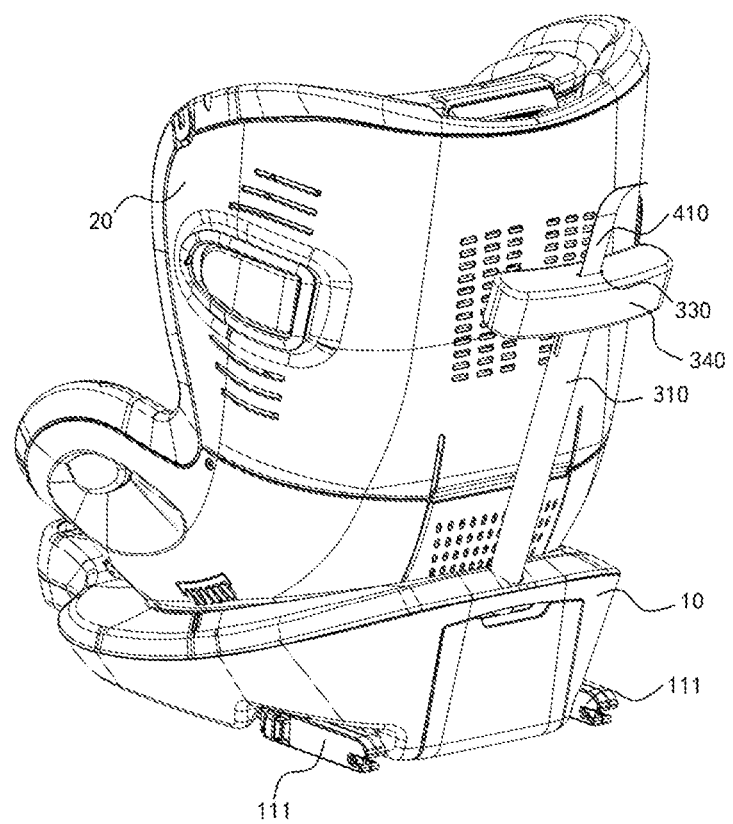
FIG. 7 is a perspective view of a further embodiment of the child safety seat of the disclosure.

In an embodiment, as shown in FIG. 7, the top rod 30 may include one vertical rod 310 and one accommodating portion 340.

One end of one belt (e.g., a connecting belts 412) in the top tether 410 may be fixed to the top rod 30. The end of the belt may move a certain distance within the accommodating portion 340. In this application, two adjusters 430 may be replaced by one two-way adjuster 440 (will be explained hereinbelow). One adjuster 430 may also be replaced by one two-way adjuster 440.

The vertical rod 310 and the fixing portion 320 may be made of different materials, for example, the vertical rod 310 is made of a metal, and the fixing portion 320 is made of a plastic.

The seat 20 is rotatably disposed on the base 10, and may rotate relative to the base 10 along an axis substantially perpendicular to an upper surface of the base 10 by an angle range. A lower surface and the upper surface of the base 10 may form an angle, such that the seat 20 is tilted forward.

Figure 8:
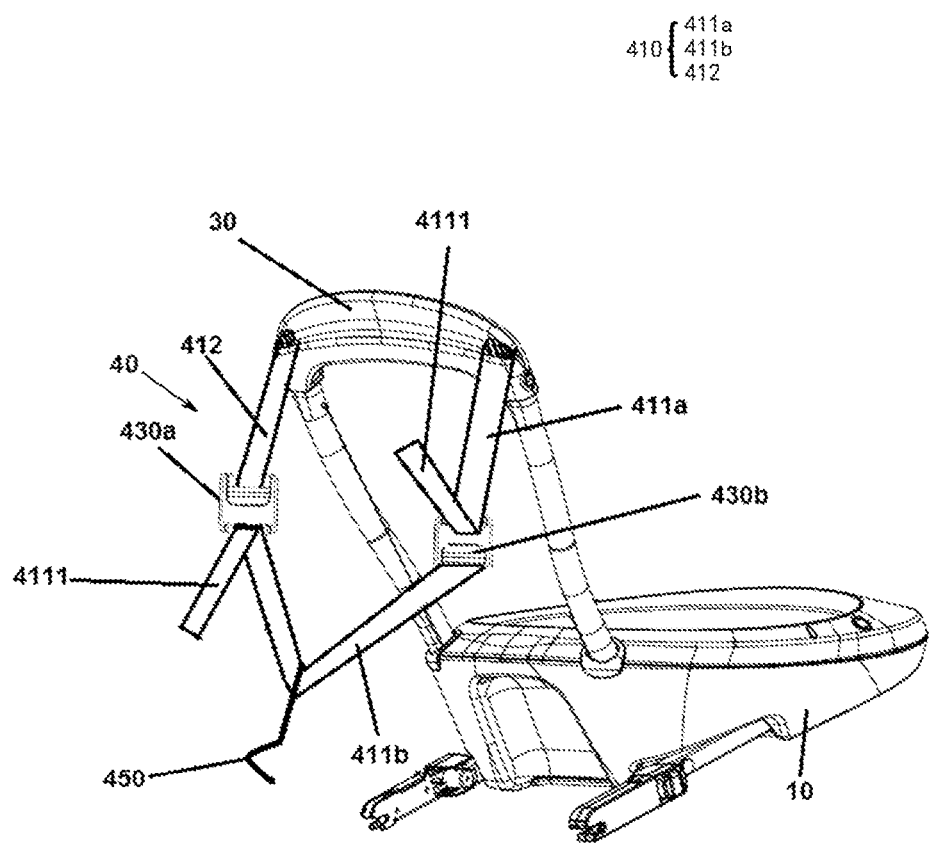
FIG. 8 is a schematic view of an embodiment of the tether assembly of the disclosure.

FIG. 8 is a schematic view of an embodiment of the tether assembly of the disclosure.

The tether assembly 40 may comprise: at least two adjusters 430; a top tether 410, fixed to the child safety seat 1, and passing through at least two adjusters 430 to form a same number of free end 4111 as that of the at least two adjusters; a tether fixing portion 450, coupled to the top tether 410 and may be fixed to a vehicle. The at least two adjusters 430 each may lock and release the top tether 410 passing therethrough.

In an embodiment, the tether assembly 40 has two adjusters 430. However, the tether assembly 40 may have more than two adjusters 430.

Figure 12:
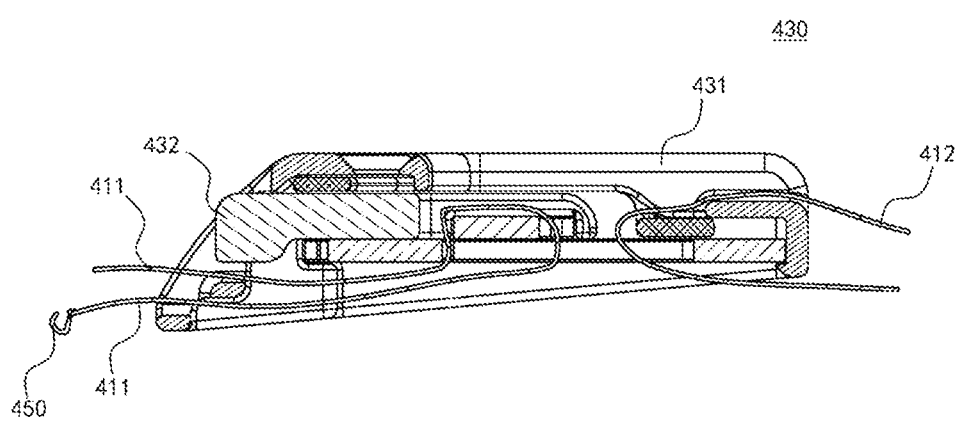
FIG. 12 is a section view of the adjuster of the tether assembly of the disclosure.

As shown in FIG. 12, the connecting belt 412 may extend into the adjuster 430 from a side, and bypass a fixing portion on the adjuster 430, and then extend out of the adjuster 430 from a lower side. In this way, the connecting belt 412 may be fixed to the adjuster 430. The adjusting belt 411 (e.g., connected to the tether fixing portion 450) may enter the adjuster 430 from an opening on the lower side of the adjuster 430, bypass a portion of the button 432, downwardly pass a gap formed between the button 432 and the adjuster housing 431, and finally extends from a left side of the adjuster 430 to form a free end 4111. When the button 432 is pressed rightward, the gap formed between the button 432 and the adjuster housing 431 becomes larger, so that the adjusting belt 411 may move freely relative to the adjuster 430. When the button 432 is released, the gap formed between the button 432 and the adjuster housing 431 becomes smaller (e.g., by an elastic force of a return spring), such that the adjusting belt 411 is clamped (stuck) by the button 432 and the adjuster housing 431 and cannot move freely relative to the adjuster 430.

Figure 4:
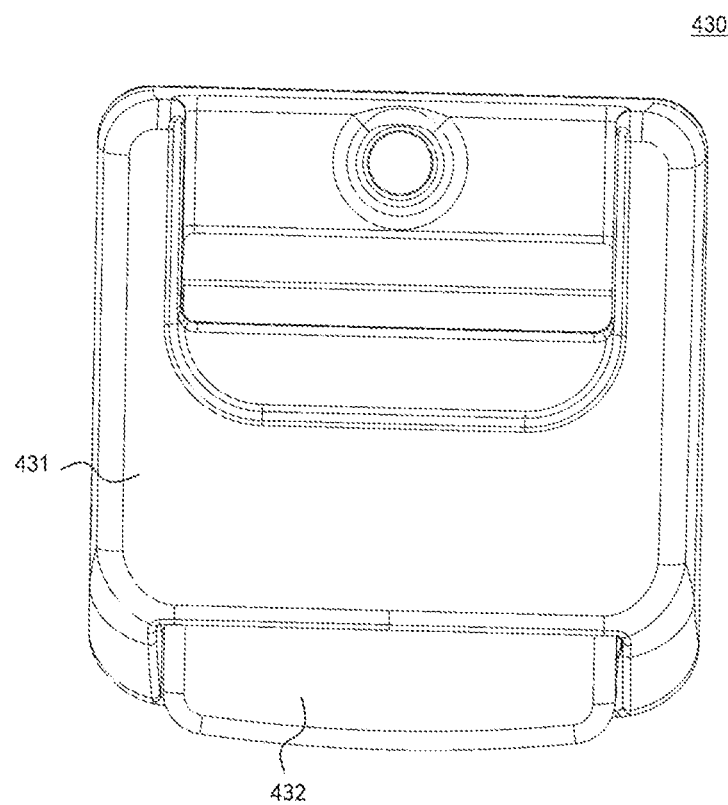
FIG. 4 is a plan view of an adjuster of a tether assembly of the disclosure.
Figure 5:
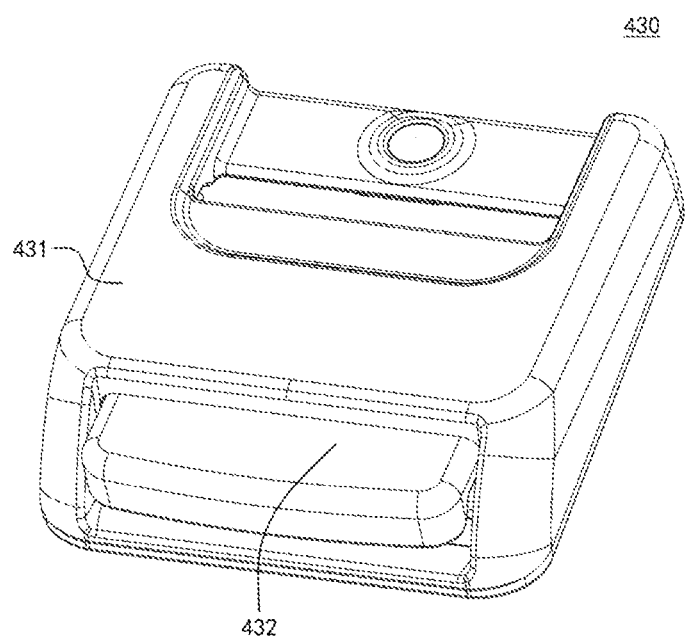
FIG. 5 is a perspective view of the adjuster of the tether assembly of the disclosure.

FIG. 4 is a plan view of the adjuster of the tether assembly of the disclosure, and FIG. 5 is a perspective view of the adjuster of the tether assembly of the disclosure.

In an embodiment, one end of the adjuster 430 may be designed as an adjusting end, and the adjusting end may be designed as a button, for example.

In an additional embodiment, the adjuster 430 may include the adjuster housing 431 and the button 432. The button 432 may have an opening on one side, and for example, the opening is located above or below the button 432. A weaved tether (e.g., the adjusting belt 411 which will be explained hereinbelow) may enter the button 432 from the opening and pass through a variable-width slit defined by the button 432 and the housing 431, and then extend out from the opening.

The adjuster 430 may be provided with a reset mechanism such as a spring and the like, so that when the button 432 is not pressed, the slit tend to shrink, so that the weaved tether passing through the adjuster 430 is stuck and cannot move relative to the adjuster 430. Moreover, when the button 432 is pressed, the slit tends to increase, so that the weaved tether passing through the adjuster 430 may move relative to the adjuster 430.

The adjuster 430 may also have some other structures. For example, the weaved tether may enter the adjuster 430 from one side and extend out from the other side. The specific structure of the adjuster 430 is not limited here, as long as it can make the adjuster have a function of adjusting the length of the weaved tether passing through it, and can lock the weaved tether when no adjustment is needed.

The adjuster 430 may be provided with a fixing portion on the other side, such that another weaved tether may be fixedly connected to the adjuster 430.

The adjuster 430 may be formed with an opening to expose a mark indicating that the adjuster 430 is locked or released. For example, the mark is a symbol of different colors.

The tether fixing portion 450 may be a hook (or a hook-shaped anchor), which can be fixedly or slidably disposed at a distal end of the top tether 410.

The two adjusters 430 of the tether assembly 40 may be arranged in opposite directions, such that two free ends 4111 formed by the top tether 410 passing through the two adjusters 430 extend out in opposite directions. It would be understood, since the top tether 410 is flexible, the directions of the adjusters 430 arranged on the top tether 410 may change. Therefore, the two adjusters 430 are arranged in opposite directions means that after the tether assembly 40 fixes the child safety seat 1 to a vehicle, in a state that the tether assembly 40 is tightened, the two adjusters 430 are arranged in a manner of having substantially reversed directions. The two free ends 4111 in opposite directions means that after the tether assembly 40 fixes the child safety seat 1 to a vehicle, the two free ends 4111 are in basically reversed directions when they just extend out from the two adjusters 430. Due to action of gravity, the two free ends 4111 will be in a dropping posture, for example. Optionally, the tether assembly 40 may have only one adjuster 430.

The two adjusters 430 of the tether assembly 40 may be arranged in a same direction, such that the two free ends 4111 formed by the top tether 410 passing through the two adjusters 430 extend out in the same direction.

As shown in FIG. 8, in an embodiment, the top tether 410 may include a first adjusting belt 411a, a second adjusting belt 411b, a first adjuster 430a, a second adjuster 430b, and a connecting belt (or first connecting belt) 412. The first adjusting belt 411a, the second adjusting belt 411b and the connecting belt 412 may be related to each other (e.g., directly connected or indirectly connected to each other via the first adjuster 430a and the second adjuster 430b) so as to constitute the top tether 410.

One end of the connecting belt 412 is fixed to one side of the top rod 30 (e.g., the inside of one vertical rod 310), and the other end of the connecting belt 412 is fixed to the first adjuster 430a.

One end of the first adjusting belt 411a is fixed to the other side of the top rod 30 (e.g., the inside of the other vertical rod 310), and the other end of the first adjusting belt 411a passes through the second adjuster 430b to form one free end 4111 extending toward the child safety seat 1.

One end of the second adjusting belt 411b is fixed to the second adjuster 430b, and the other end of the second adjusting belt 411b passes through the first adjuster 430a to form one free end 4111 extending away from the child safety seat 1.

One end of the tether fixing portion 450 may be slidably or fixedly connected to the second adjusting belt 411b, and the other end of the tether fixing portion is formed as a hook.

In this way, the tether assembly 40 can be tightened in two opposite directions, such that the tether assembly 40 may be mounted more easily, moreover, because the tightening force may be applied more easily, the tether assembly 40 may also be assuredly tightened, thereby improving safety of the tether assembly. In addition, the length of the tether assembly 40 can be adjusted in a larger range.

Optionally, in this embodiment, the top tether 410 may have only one adjuster 430. Optionally, in this embodiment, the top tether 410 may have three adjusters 430. Optionally, the adjusters 430 may be two-way adjusters (as will be explained hereinbelow).

Figure 9:
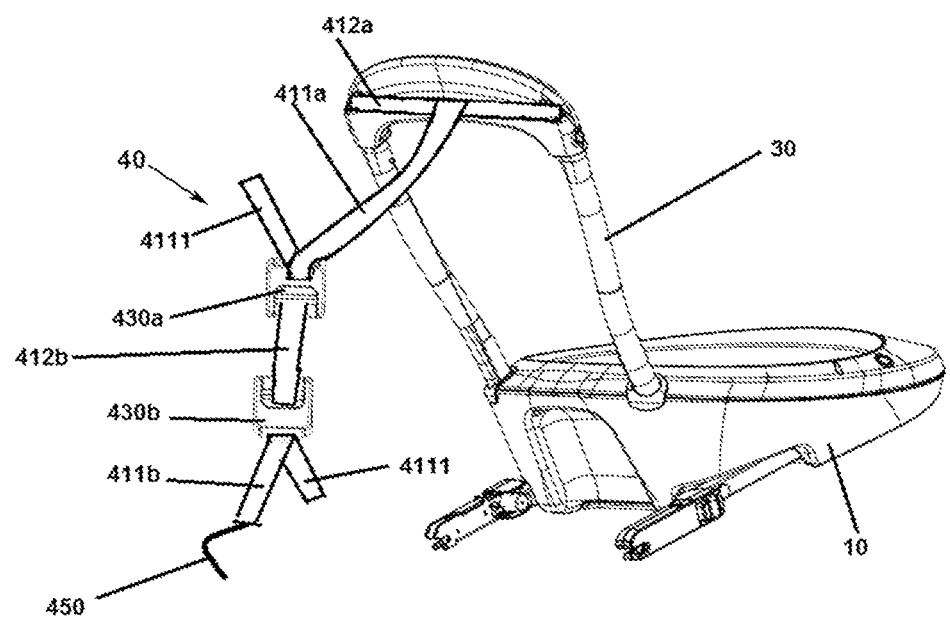
FIG. 9 is a schematic view of another embodiment of the tether assembly of the disclosure.

As shown in FIG. 9, in an embodiment, the top tether 410 may have a first adjusting belt 411a, a second adjusting belt 411b, a first adjuster 430a, a second adjuster 430b, a first connecting belt 412a, and a second connecting belt 412b.

Both ends of the first connecting belt 412a are respectively fixed to both sides of the top rod 30, for example, fixed on the two vertical rods 310 or fixed to the inner side of the two vertical rods 310.

One end of the first adjusting belt 411a is slidably or fixedly connected to the first connecting belt 412a, and the other end of the first adjusting belt 411a passes through the first adjuster 430a to form one free end 4111 extending toward the child safety seat 1.

Both ends of the second connecting belt 412b are respectively fixed to the first adjuster 430a and the second adjuster 430b.

One end of the second adjusting belt 411b passes through the second adjuster 430b to form one free end 4111 extending out of the child safety seat 1, and the tether fixing portion 450 is fixed to the other end of the second connecting belt 412*b*.

In this way, the tether assembly 40 occupies a relative small space, and can be mounted in the relatively narrow compartment of the vehicle.

Optionally, in this embodiment, the top tether 410 may have only one adjuster 430. Optionally, in this embodiment, the top tether 410 may have three adjusters 430. Optionally, one adjuster 430 may be a two-way adjuster (as will be explained hereinbelow).

Figure 10:
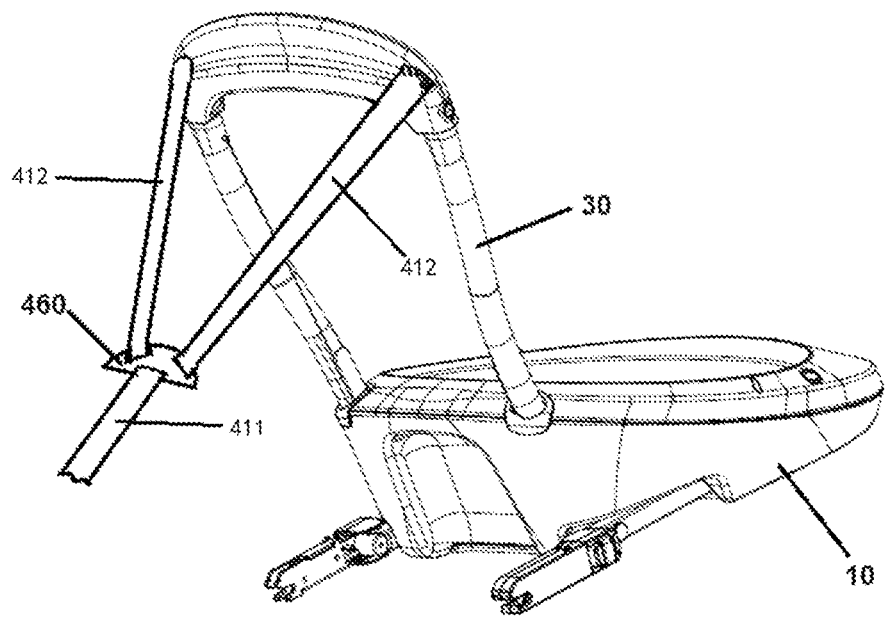
FIG. 10 is a schematic view of a further embodiment of the tether assembly of the disclosure.

As shown in FIG. 10, the tether assembly may further comprise a connecting member 460 for connecting two connecting belts 412 and one adjusting belt 411 together. The two connecting belts 412 may be fixed to a side of the connecting member 460, and one adjusting belt 411 may be fixed to the other side of the connecting member 460. The connecting member 460 may be an iron sheet with three elongated holes formed therein.

Optionally, in this embodiment, the top tether 410 may have only one adjuster 430. Optionally, in this embodiment, the top tether 410 may have three adjusters 430. Optionally, one adjuster 430 may be a two-way adjuster (as will be explained hereinbelow).

Figure 11:
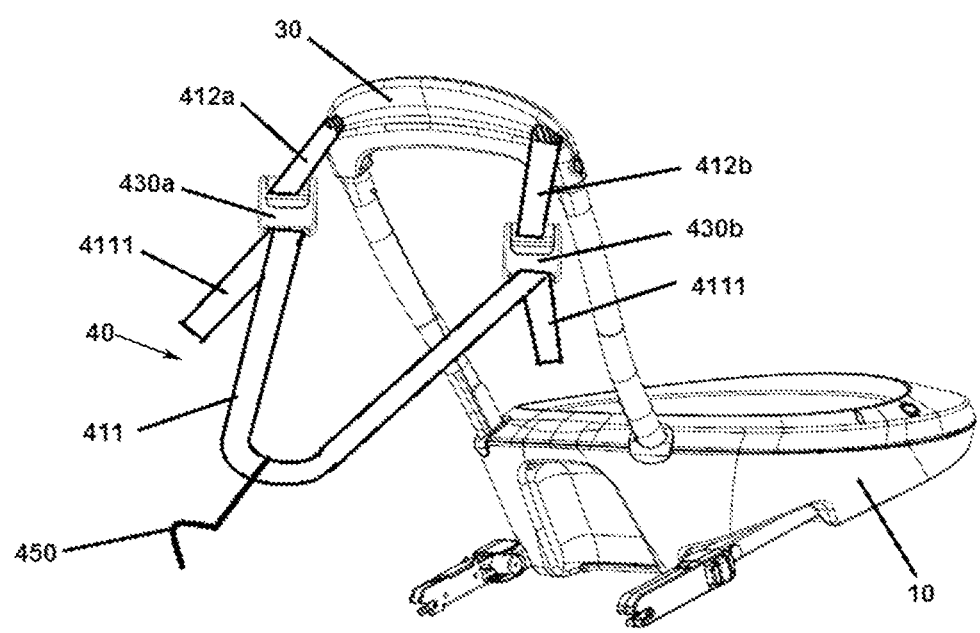
FIG. 11 is a schematic view of an additional embodiment of the tether assembly of the disclosure.

FIG. 11 is a schematic view of an additional embodiment of the tether assembly of the disclosure.

The tether assembly 40 may comprises a first adjuster 430*a*, a second adjuster 430*b*, and one adjusting belt 411. The first adjuster 430*a* and the second adjuster 430*b* are arranged in a same direction. Both ends of the adjusting belt 411 respectively pass through the first adjuster 430*a* and the second adjuster 430*b* to form two free ends 4111 extending in a same direction (the direction away from the child safety seat). The first adjuster 430*a* and the second adjuster 430*b* may be fixed to both sides of the top rod 30 via a connecting belt 412. The tether fixing portion 450 is slidably connected to the adjusting belt 411.

In this way, when the child safety seat 1 is placed on the right side seat and the left side of the vehicle, the tether assembly 40 can be adjusted by the adjuster on the closer side, so it is more convenient to apply force. Adjustments performed by two adjusters have similar effects. In addition, two adjusters may make the adjustable range of the length of the tether assembly 40 wider.

Optionally, in this embodiment, the top tether 410 may have only one adjuster 430. Optionally, in this embodiment, the top tether 410 may have three adjusters 430. Optionally, one adjuster 430 may be a two-way adjuster (as will be explained hereinbelow).

Figure 13:
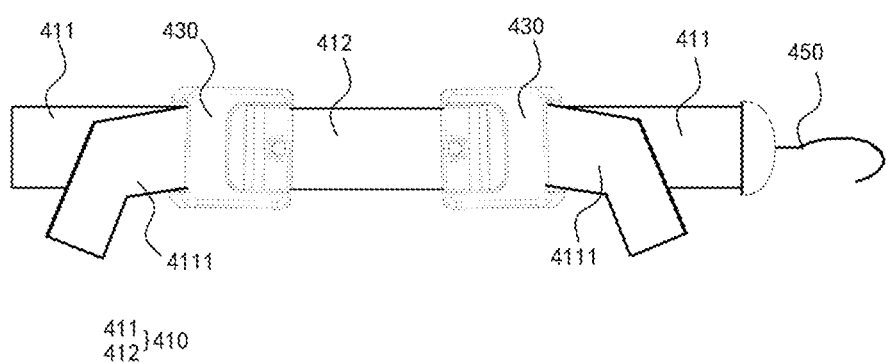
FIG. 13 is a schematic view of another embodiment of the tether assembly of a child safety seat of the disclosure.

FIG. 13 is a schematic view of an embodiment of the tether assembly 40 of the child safety seat of the disclosure. The tether assembly 40 may comprise a top tether 410, an adjuster 430, and a tether fixing portion 450. The top tether 410 may include an adjusting belt 411 and a connecting belt 412. The adjusting belt 411 may pass through the adjuster 430 to extend for forming a free end 4111. The adjuster 430 may have a button. When the button is not pressed, the adjuster 430 locks the adjusting belt 411, and when the button is pressed, the adjuster 430 releases the adjusting belt 411. At this time, pulling the free end 4111 may shorten a length of the adjusting belt 411, and pulling the adjusting belt 411 may increase the length of the adjusting belt 411.

Figure 14:
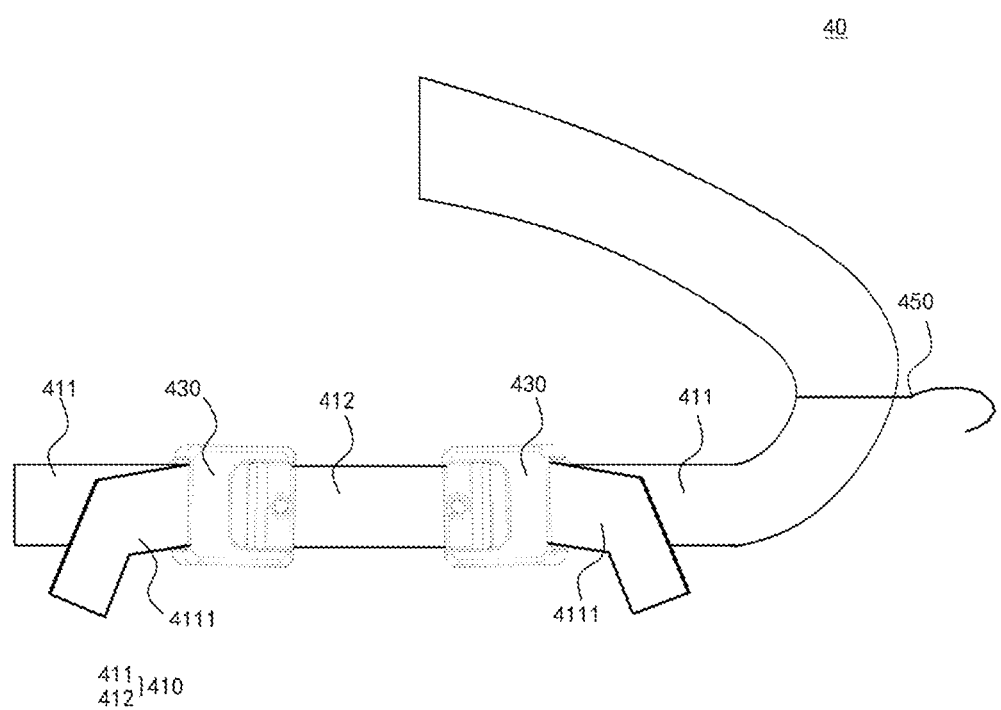
FIG. 14 is a schematic view of another embodiment of the tether assembly of the child safety seat of the disclosure.

FIG. 14 is a schematic view of another embodiment of the tether assembly of the child safety seat of the disclosure. The tether assembly 40 may have two adjusters 430. The two adjusters 430 may be arranged in opposite directions. The top tether 410 may include two adjusting belts 411 and one connecting belt 412. The connecting belt 412 is connected between the two adjusters 430. The two adjusting belts 411 respectively pass through the two adjusters 430 to form two free ends 4111 toward opposite directions, such that the length of the tether assembly 40 may adjusted in two opposite directions by pulling the two free ends 4111.

In an embodiment, the tether fixing portion 450 is fixed to an end of one of the two adjusting belts 411, and the other one of the two adjusting belts 411 is fixed on the top rod 30.

In another embodiment, the tether fixing portion 450 is slidably connected to one of the two adjusting belts 411, and the other one of the two adjusting belts 411 is fixed on the top rod 30.

In a further embodiment, the tether assembly 40 further comprises a two-way adjuster 441. The two-way adjuster 441 may adjust the length of the tether assembly 40 in two opposite directions. In other words, the two adjusting belts 411 may respectively pass through the two-way adjuster 441 from both ends to form two free ends 4111 toward opposite directions, such that the length of the tether assembly 40 may adjusted in two opposite directions by pulling the two free ends 4111.

Figure 15:
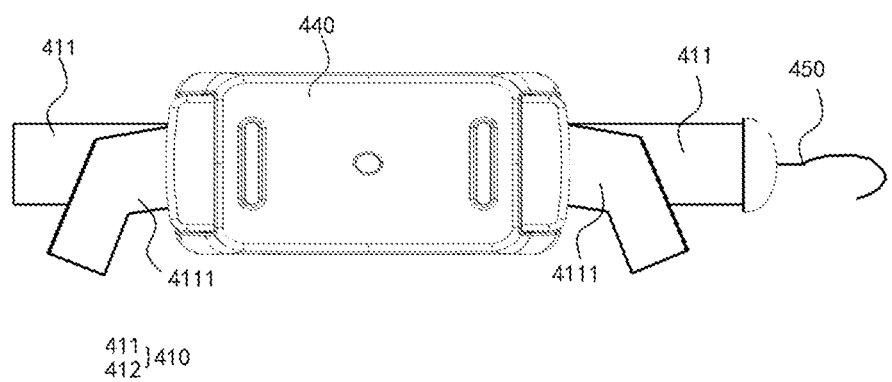
FIG. 15 is a schematic view of another embodiment of the tether assembly of the child safety seat of the disclosure.
Figure 16:
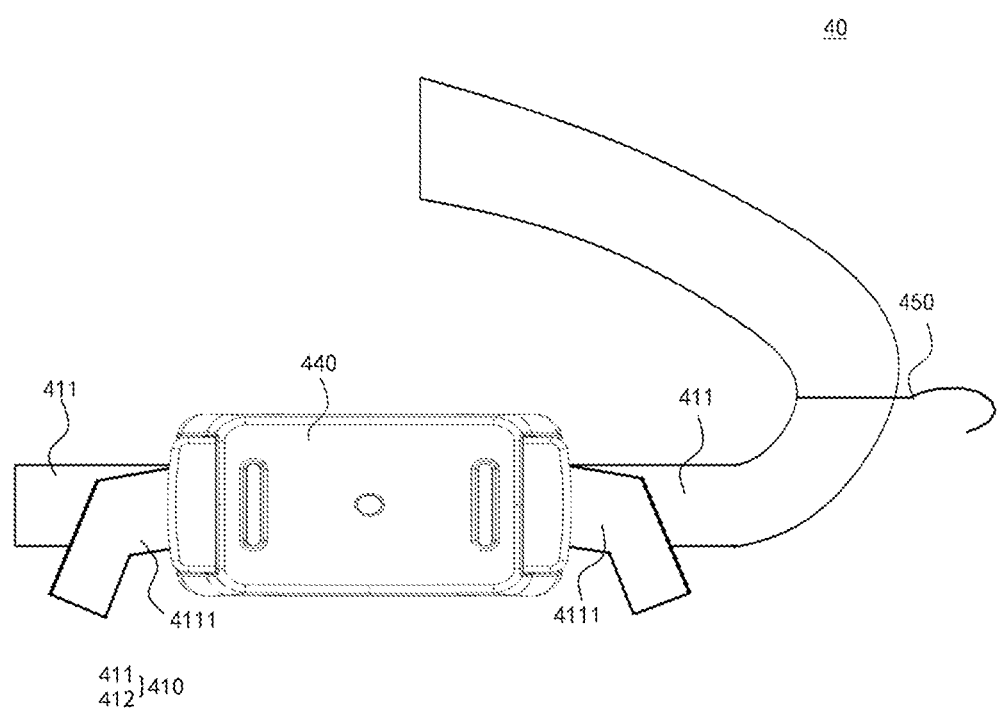
FIG. 16 is a schematic view of another embodiment of the tether assembly of the child safety seat of the disclosure.

FIG. 15 is a schematic view of another embodiment of the tether assembly of the child safety seat of the disclosure, and FIG. 16 is a schematic view of another embodiment of the tether assembly of the child safety seat of the disclosure. The embodiments shown in FIG. 15 and FIG. 16 are respectively similar to the embodiments shown in FIG. 13 and FIG. 14 except that a two-way adjuster 440 is used to replace the two adjusters 430 and the connecting belt 412.

Figure 17:
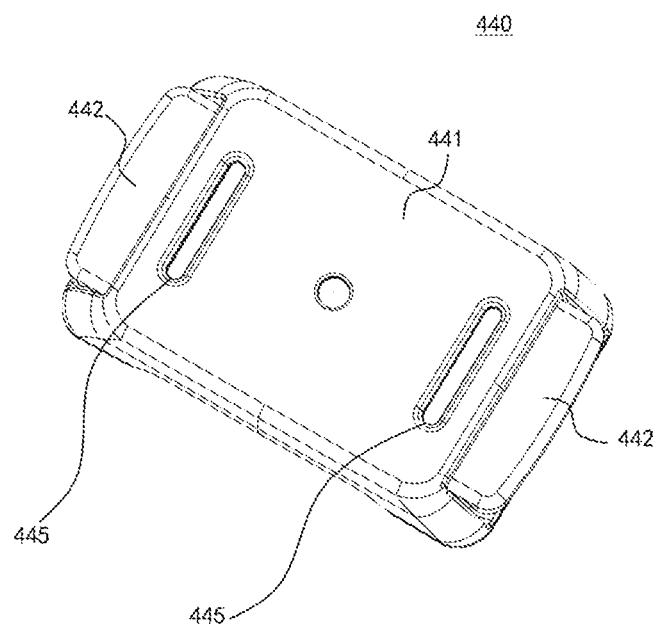
FIG. 17 is a perspective view of a two-way adjuster of the child safety seat of the disclosure.
Figure 18:
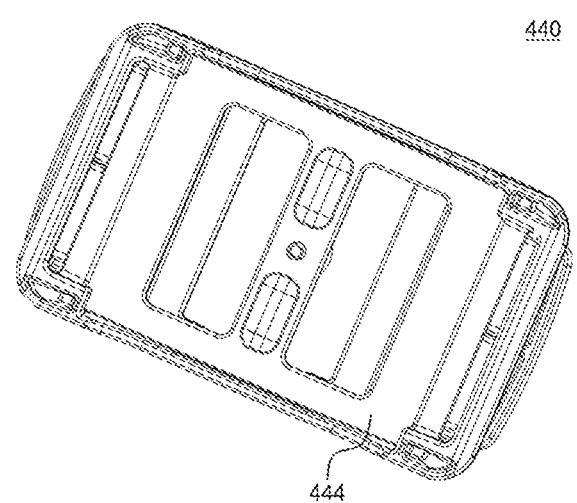
FIG. 18 is another perspective view of the two-way adjuster of the child safety seat of the disclosure.
Figure 19:
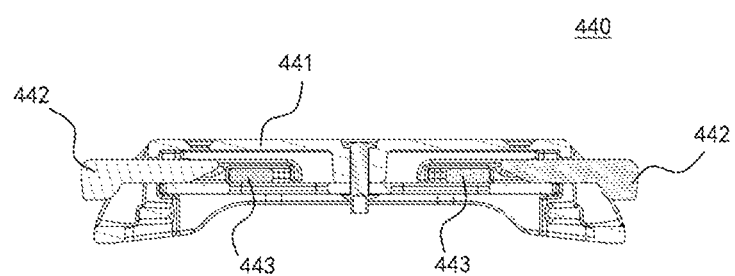
FIG. 19 is a section view of the two-way adjuster of the child safety seat of the disclosure, in which a button is not pressed.
Figure 20:
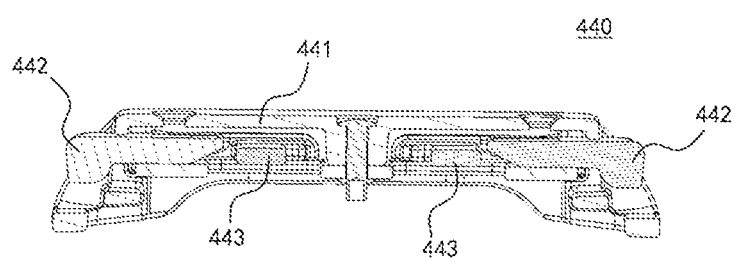
FIG. 20 is a section view of the two-way adjuster of the child safety seat of the disclosure, in which a button is pressed.
Figure 21:
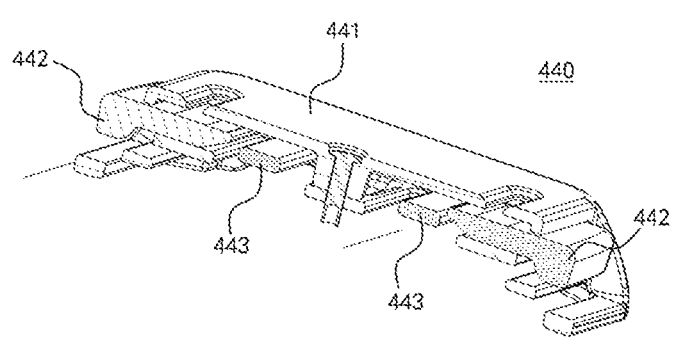
FIG. 21 is a perspective section view of the two-way adjuster of the child safety seat of the disclosure.
Figure 22:
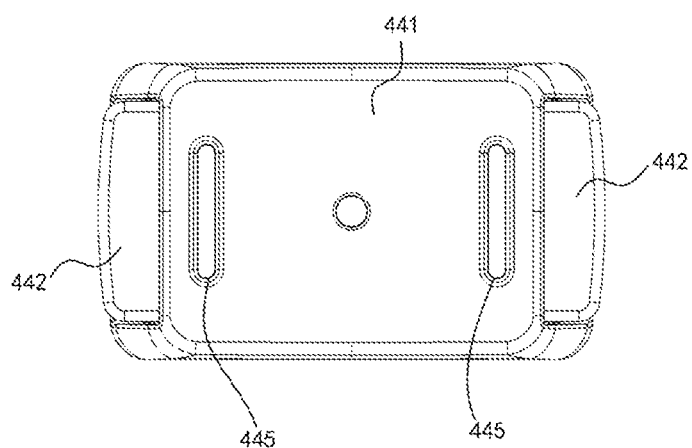
FIG. 22 is a top view of the two-way adjuster of the child safety seat of the disclosure, in which a button is not pressed.
Figure 23:
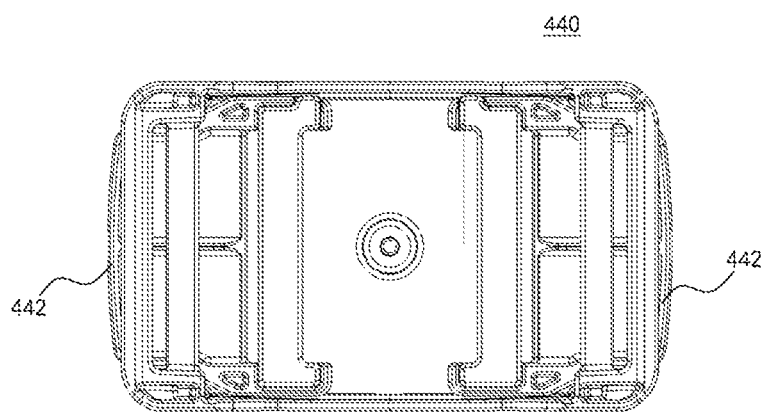
FIG. 23 is a bottom view of the two-way adjuster of the child safety seat of the disclosure, in which a button is not pressed.
Figure 24:
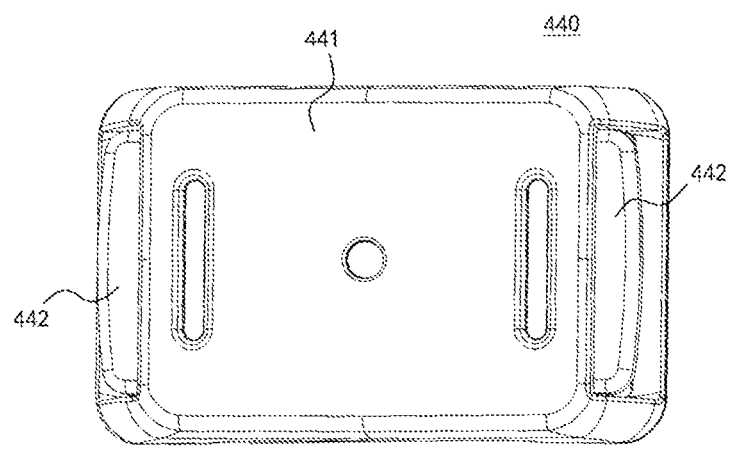
FIG. 24 is a top view of the two-way adjuster of the child safety seat of the disclosure, in which a button is pressed.
Figure 25:
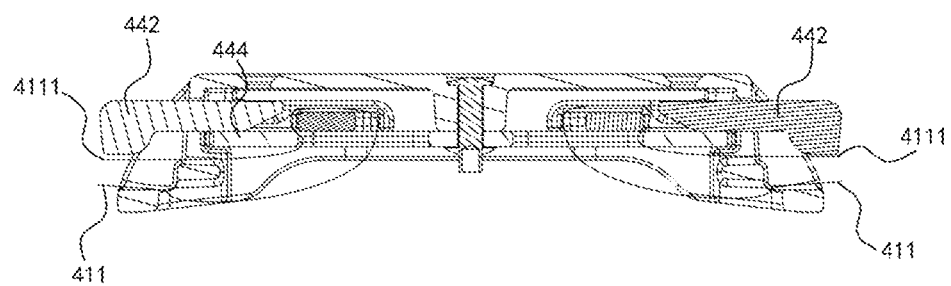
FIG. 25 is a schematic section view of the two-way adjuster of the child safety seat of the disclosure.

FIG. 17 is a perspective view of a two-way adjuster of the child safety seat of the disclosure; FIG. 18 is another perspective view of the two-way adjuster of the child safety seat of the disclosure; FIG. 19 is a section view of the two-way adjuster of the child safety seat of the disclosure, in which a button is not pressed; FIG. 20 is a section view of the two-way adjuster of the child safety seat of the disclosure, in which a button is pressed; FIG. 21 is a perspective section view of the two-way adjuster of the child safety seat of the disclosure; FIG. 22 is a top view of the two-way adjuster of the child safety seat of the disclosure, in which a button is not pressed; FIG. 23 is a bottom view of the two-way adjuster of the child safety seat of the disclosure, in which a button is not pressed; FIG. 24 is a top view of the two-way adjuster of the child safety seat of the disclosure, in which a button is pressed; FIG. 25 is a schematic section view of the two-way adjuster of the child safety seat of the disclosure.

The two-way adjuster 440 may include: an adjuster housing 441 having two first openings facing opposite directions; two buttons 442 respectively disposed at the two first openings and capable of moving in directions into and away from the adjuster housing 441; fixed sheets 443 fixed at a bottom of the adjuster housing 441 and formed with two second openings; two locking members 444 disposed inside the adjuster housing 441 and respectively move along with the two buttons 442 to a locked position and a released position, wherein two belts (e.g., top belts 410) may respectively enter the adjuster housing 441 via the two second openings, pass through a gap between the two locking members 444 and the fixed sheet 443, and extend out of the adjuster housing 441 to form two free ends extending in opposite directions, and wherein in the locked position, the two locking members 444 and the fixed sheet 443 respectively clamp the two belts, and in the released position, the two locking members 444 and the fixed sheet 443 allow the two belts to move.

A spring may be disposed between the two buttons 442, so as to respectively apply force to the two buttons 442 for restoring the adjuster housing 441.

An upper surface of the adjuster housing 441 may be formed with two tightening indicating windows 445 to respectively indicate whether the two belts are tightened. Different positions on the upper surfaces of the two buttons 442 may be marked with different colors, such that when the buttons 442 are in the locked position, the tightening indicating windows 445 show one color (e.g., green) on the upper surface of the buttons 442, and when the buttons 442 are in the released position, the tightening indicating windows 445 show the other one color (e.g., red) on the upper surface of the buttons 442. Alternatively, the tightening indicating windows 445 may also be disposed at other positions of the adjuster housing 441, such as a side surface, a bottom surface and both ends, and the application is not limited thereto. The tightening indicating windows 445 may also be used to provide information in other ways, such as lines, graphic marks, and the present application is not limited thereto. The tightening indicating windows 445 may also be formed of a transparent material so that the inside of the adjuster housing 441 can be seen.

The two-way adjuster 440 may adjust the length of the top tether 410 in different directions.

As shown in FIG. 25, when the top tether 410 passes through the two-way adjuster 440, it firstly enters the adjuster housing 441 upward from the openings of the locking members 444, then passes upward through an inner side of the fixed sheet 443 and the buttons 442 (the middle in FIG. 25), then bypasses the fixed sheet 443, and extends downward again on outside of the fixed sheet 443 (left and right sides in FIG. 25) to pass through the gap between the fixed sheet 443 and the locking members 444, and finally extends out of the adjuster housing 441 downward below the locking members 444.

In this way, when the top tether 410 is tightened, the top tether 410 may be clamped between the locking members 444 and the fixed sheet 443 (because when the adjusting belts 111 is tensioned, the top tether 410 pulls the fixed sheet 443 outward, such that the fixed sheet 443 and the locking members 444 tend to be closer to each other), so as to realize positioning of the top tether 410. Moreover, when the length of the top tether 410 needs to be adjusted, the buttons 442 may be pressed, so as to bring the fixed sheet 443 away from the locking members 444, and the top tether 410 is released, accordingly a length adjustment may be performed.

When the two-way adjuster 440 is used, the two top belts 410 passing through the two-way adjuster 440 respectively extend into the top rod 30 and are connected to the tether fixing portion 450, such that the length of the tether assembly 40 can be adjusted in different directions.

After considering the description and practicing the disclosure, those skilled in the art will easily think of other embodiments of the disclosure. For example, the tether assembly may be connected to the base 10, and may also be connected to the seat 20. The disclosure is intended to cover any variants, uses or adaptable changes of the embodiments. These variants, uses or adaptable changes follow the general principles of the present disclosure and include those in the technical field not related in the disclosure. The description and the embodiments are only regarded as exemplary, and the true scope and spirit of the disclosure shall only be defined by the claims attached below.

Although the disclosure has been provided by with reference to typical embodiments, the terms used are illustrative and exemplary rather than restrictive. Since the disclosure can be implemented in various forms without departing from the spirit and essence of the disclosure, it should be understood, the above-mentioned embodiments are not limited to any of the foregoing details, but shall be interpreted in the broadest sense within the scope defined by the claims. Therefore, any variation falling within the scope of the claims or their equivalents shall be covered by the claims.

REFERENCE NUMERAL LIST

Child Safety Seat 1
  Base 10
    Anchor Part 110
      Anchor Arm 111
  Seat 20
  Top Rod 30
    Vertical Rod 310
    Fixing Portion 320
    Opening 330
    Accommodating Portion 340
  Tether Assembly 40
    Top Tether 410
      Adjusting Belt 411
      First Adjusting Belt 411a
      Second Adjusting Belt 411b
        Free End 4111
      Connecting Belt 412
      First Connecting Belt 412a
      Second Connecting Belt 412b
    Adjuster 430
      First Adjuster 430a
      Second Adjuster 430b
      Housing 431
      Button (Adjusting End) 432
    Two-Way Adjuster 440
      Adjuster Housing 441
      Button 442
      Fixed Sheet 443
      Locking Member 444
      Tightening Indicating Window 445
    Tether Fixing Portion 450
    Connecting Member 460

What is claimed is:

1. A tether assembly for fixing a child safety seat to a vehicle, wherein the tether assembly comprises:
   a first adjuster and a second adjuster for adjusting a length of the tether assembly;
   a tether fixing portion being fixable to a corresponding fixing portion of the vehicle;
   a top tether comprising a connecting belt and an adjusting belt, the connecting belt positioned between the child safety seat and at least one of the first and second adjusters, and
   the adjusting belt passing through the first and second adjusters, the adjusting belt connected to the tether fixing portion, and the adjusting belt is separate from the connecting belt and forms two free ends, with a free end extending from each of the first and second adjusters.

2. The tether assembly according to claim 1, wherein the child safety seat comprises a base, a seat disposed above the base, and a top rod erected at a rear of the base.

3. The tether assembly according to claim 1, wherein the first and second adjusters are one-way adjusters, the top tether comprises a first connecting belt, a second connecting belt, and the adjusting belt, ends of the first connecting belt and the second connecting belt are respectively fixed to both sides of the child safety seat, the other ends of the first connecting belt and the second connecting belt are respectively connected to both ends of the adjusting belt via the two one-way adjusters.

4. The tether assembly according to claim 3, wherein the two one-way adjusters are oriented in a same direction, such that the two free ends extend in the same direction.

5. The tether assembly according to claim 3, wherein the two one-way adjusters are oriented in opposite directions, such that the two free ends extend in the opposite directions.

6. The tether assembly according to claim 3, wherein the tether fixing portion is fixedly or slidably connected to the adjusting belt.

7. The tether assembly according to claim 1, wherein the first and second adjusters are two-way adjuster or one-way adjusters, and the two free ends are formed by the adjusting belt passing through the two-way adjusters or the one-way adjusters.

8. The tether assembly according to claim 7, wherein the top tether comprises a first connecting belt, a second connecting belt, and the adjusting belt, one ends of the first connecting belt and the second connecting belt are respectively fixed to both sides of the child safety seat, the other ends of the first connecting belt and the second connecting belt are respectively connected to the first and second adjusters.

9. The tether assembly according to claim 1, wherein the first and second adjusters each have a locked position and a released position, in the locked position, the top tether passing through the adjuster is clamped by the adjuster, and in the released position, the adjuster allows the top tether passing through the adjuster to move relative to the adjuster.

10. A child safety seat comprising:
a base provided with an anchor part protruding backwardly;
a seat rotatably disposed on the base;
a top rod fixed to a rear of the base; and
a tether assembly comprising:
a first adjuster and a second adjuster for adjusting a length of the tether assembly;
a tether fixing portion being fixable to a corresponding fixing portion of a vehicle;
a top tether comprising a connecting belt and an adjusting belt, the connecting belt positioned between the child safety seat and at least one of the first adjuster and the second adjuster,
the adjusting belt passing through the first and second adjusters, the adjusting belt connected to the tether fixing portion, and the adjusting belt is separate from the connecting belt and forms two free ends, with a free end extending from each of the first and second adjusters; and
the connecting belt of the top tether is fixed to the top rod.

11. The child safety seat according to claim 10, wherein the top rod comprises two vertical rods and a fixing portion, and each of tops of the two vertical rods is provided with an opening.

12. The child safety seat according to claim 10, wherein the top rod comprises two vertical rods and a fixing portion, and an upper surface of the fixing portion is centrally provided with an opening.

13. The child safety seat according to claim 10, wherein the top rod comprises one vertical rod and one accommodating portion, and an upper surface of the accommodating portion is centrally provided with an opening.

14. A tether assembly for fixing a child safety seat to a vehicle, wherein the tether assembly comprises:
a first two-way adjuster and a second two-way adjuster being able to adjust a length of the tether assembly in two opposite directions;
a tether fixing portion being fixable to a corresponding fixing portion of the vehicle;
a top tether comprising a connecting belt and an adjusting belt separated from each other, wherein the connecting belt is positioned between and connects at least one of the first and second two-way adjusters to the child safety seat, and
the adjusting belt passes through the first and second two-way adjusters, the adjusting belt is connected to the tether fixing portion, and the adjusting belt forms two free ends with a free end extending from each of the first and second two-way adjusters.

15. The tether assembly according to claim 14, wherein each of the two-way adjusters comprises:
an adjuster housing having two first openings facing opposite directions;
two button respectively disposed at the two first openings and movable in directions of entering and leaving the adjuster housing;
a fixed sheet fixed on a bottom of the adjuster housing and formed with two second openings; and
two locking members disposed inside the adjuster housing and being movable along with the two buttons to form a locked position and a released position.

16. The tether assembly according to claim 15, wherein two of the belts are able to enter the adjuster housing via the two second openings, pass through gaps between the two locking members and the fixed sheet, and extend out of the adjuster housing to form free ends extending in two opposite directions, and
wherein in the locked position, the two locking members and the fixed sheet respectively clamp the two belts, and in the released position, the two locking members and the fixed sheet allow the two belts to move.

17. The tether assembly according to claim 16, wherein in the released position, when the free ends are pulled, the tether assembly is shortened, and when portions of the two belts other than the free ends are pulled, the tether assembly extends longer.

18. The tether assembly according to claim 15, wherein a spring is disposed between the two buttons for respectively applying force to the two buttons for moving out of the adjuster housing.

19. The tether assembly according to claim 15, wherein two tightening indicating windows are formed on an upper surface of the adjuster housing to respectively indicate whether two of the belts are tightened.

* * * * *